Nov. 9, 1971 B. L. RIGGS 3,618,156
POWER WIPER FOR REAR VIEW MIRRORS
Filed Aug. 17, 1970 3 Sheets-Sheet 3

INVENTOR.
BENJAMIN L. RIGGS
BY
Drummond, Cahill & Phillips
ATTORNEYS

United States Patent Office 3,618,156
Patented Nov. 9, 1971

3,618,156
POWER WIPER FOR REAR VIEW MIRRORS
Ben L. Riggs, Rte. 2, Box 87–B, Chandler, Ariz. 85224
Filed Aug. 17, 1970, Ser. No. 64,214
Int. Cl. B60s 1/44
U.S. Cl. 15—250.29            5 Claims

ABSTRACT OF THE DISCLOSURE

A power wiper for rear view mirrors in which a wiper blade operates in rectilinear and oscillatory motion over the surface of a substantially rectangular mirror and the wiper blade is actuated by a motor having a shaft continuously rotatable in one direction; lever arms and bearings are operable by said motor shaft and coupled to opposite ends of the wiper blade for creating oscillatory action thereof relative to the surface of the mirror.

---

The prior art mechanisms for wiping rear vision mirrors have generally utilized motors having mechanism for alternately reversing rotation of the output shaft thereof in order to accomplish oscillatory action of a mirror wiper in connection with the motor. Such motors have been used in connection with automobile windshield wiper mechanisms and have also been adapted for use in connection with rear view mirror wipers.

Conventional reduction gear motors having a power output shaft operable continuously in the same direction are highly desirable from a maintenance and functional standpoint since they do not incorporate any mechanism for alternately reversing rotational direction of the power output shaft thereof.

In accordance with the present invention, a motor having a power output shaft which is operable constantly in one direction, is used in connection with a novel lever arm and bearing mechanism to cause oscillatory rectilinear action of a wiper blade in relation to the surface of a rear view mirror. The invention thus utilizes a conventional reduction gear motor without the complexity of reversing mechanism therein and provides for oscillatory action of a mirror wiper blade by three simple lever arms together with pivot bearings and a simple crank arm mechanism driven by the power output shaft of the reduction gear motor of the invention. The power wiper for rear view mirrors, constructed with respect to the invention, is contained in a compact housing which is fully enclosed except for one open side through which the rear view mirror may be seen.

The mechanism of the invention, responsible for oscillatory movement of the mirror wiping blade, is readily and easily serviced without disturbing or disassembling the motor of the invention.

Accordingly, it is an object of the present invention to provide a power wiper for rear view mirrors comprising a very simple mechanism in connection with a reduction gear motor for creating oscillatory motion of a wiper blade back and forth over the surface of a rear view mirror.

Another object of the invention is to provide a very simple oscillating mechanism used in connection with a reduction gear motor, having a shaft continuously operable in one direction, whereby a wiper blade may be moved in an oscillatory motion backward and forward over the surface of a rear view mirror for wiping the same.

Another object of the invention is to provide a power wiper mechanism for rear view mirrors which is very simple and economical of construction and very reliable in operation.

Another object of the invention is to provide a power wiper mechanism for rear view mirrors which includes oscillatory mechanism readily and easily serviced and maintained.

Further objects and advantages of the invention may be apparent from the following specification, appended claims and accompanying drawings.

Figure 1:
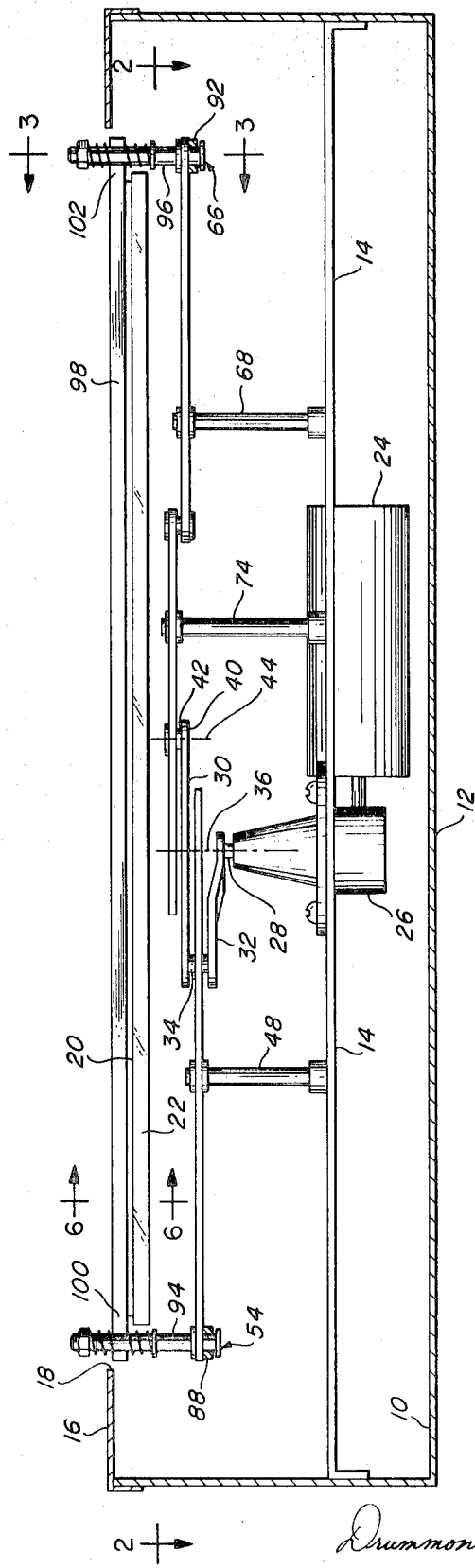
FIG. 1 is a longitudinal, sectional view of the power wiper mechanism for rear view mirrors of the invention, and showing the housing thereof in section and the wiper operating mechanism in elevation in the housing.

The invention comprises a frame 10 which includes an outer box shaped housing 12 and a mechanism mounting plate 14 which is disposed in the box shaped housing 12 and is fixed therein.

The box shaped housing 12 is provided with a removable cover 16 which partially encloses an open side of the box shaped housing 12 and this cover 16 is provided with a rectangular opening 18 through which the face 20 of a rear view mirror 22 may be seen.

The motor mounting plate 14 carries an electric motor 24 having a reduction gear box 26 provided with a power output shaft 28 adapted to rotate continuously in one direction.

Coupled to the shaft 28 is a crank arm mechanism 30. This crank arm mechanism 30 is provided with an arm portion 32 which is fixed to the shaft 28 and which carries a crank pin bearing 34. This crank pin bearing 34 is provided with a bearing axis 36 spaced from the rotary axis 38 of the motor output shaft 28. The axis 36 is substantially parallel to the axis 38 and carried by the crank pin bearing 34 is a second crank arm portion 40. This crank arm portion 40 is spaced from the arm portion 32 and carries the second crank pin bearing 42 which is also spaced from the shaft 28.

Figure 2:
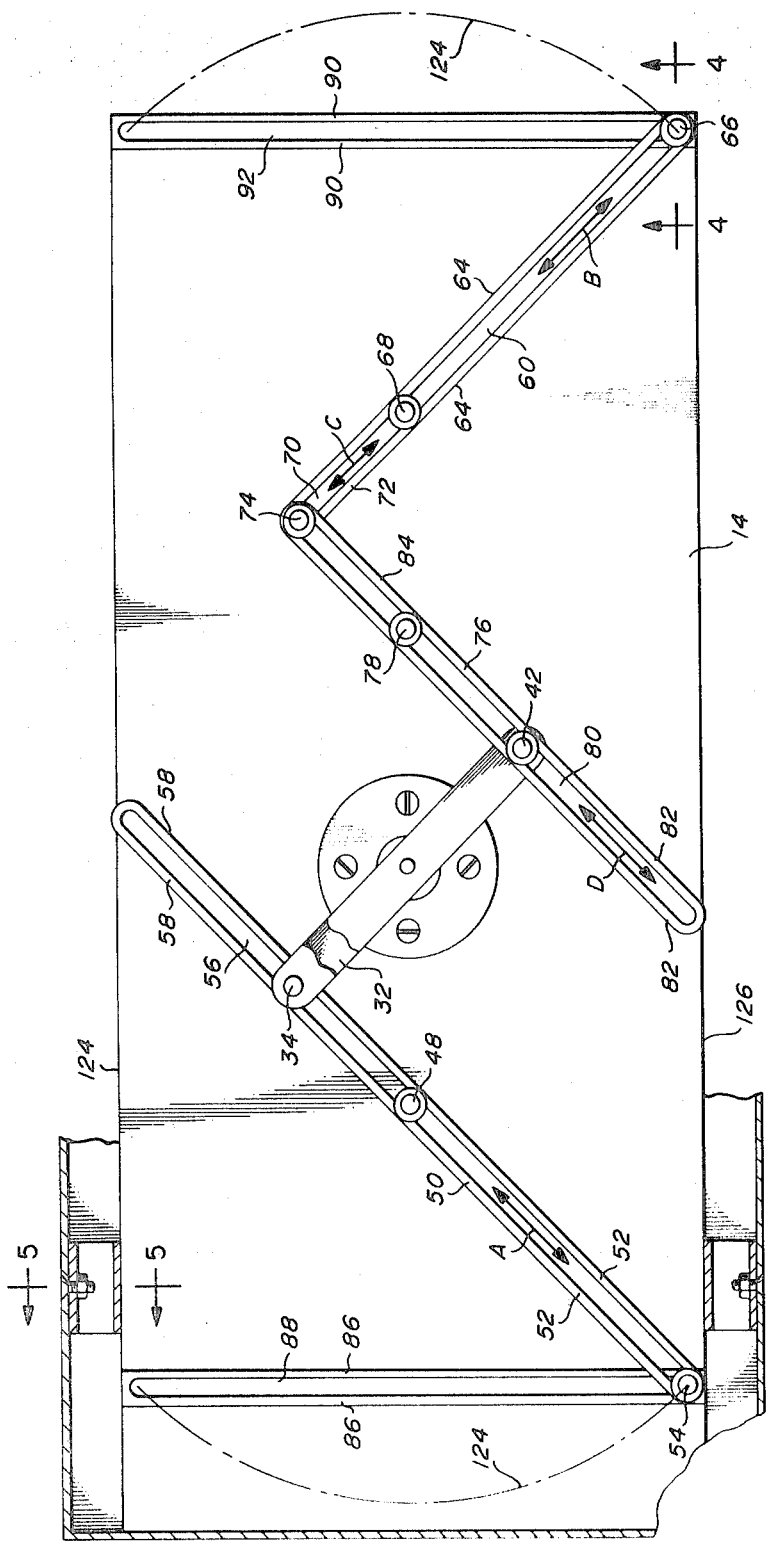
FIG. 2 is a sectional view taken from the line 2—2 of FIG. 1.

The crank pin bearing 42 is provided with an axis 44 which is parallel to the axes 36 and 38 and, as shown in FIG. 2 of the drawings, the first and second crank pin bearings 34 and 42 are adapted to be operated continuously in a circular path about the axis 38 of the motor output shaft 28.

The crank pin bearing 34 extend through a first lever arm 46. This first lever arm 46 is pivotally mounted on a first stationary pivot bearing 48 which is fixed to the plate 14 as shown best in FIG. 1 of the drawings. The first lever arm 46 is provided with a first bearing track means 50 which consists of a pair of spaced apart rails 52 between which a first wiper guide bearing means 54 is disposed. This bearing means 54 is adapted to traverse between the rails 52 in an oscillatory manner as indicated by an arrow A in FIG. 2 of the drawings, all as will be hereinafter described in detail.

The first bearing track means 50 extends away from the stationary pivot bearing 48 in one direction and the lever arm 46 is provided with a second bearing track means 56 which extends away from the stationary pivot bearing 48 in a direction opposite to that of the bearing track means 50.

The second bearing track means 56 is provided with a pair of spaced rail portions 58 between which the first crank pin bearing 34 is disposed as shown best in FIGS.

1 and 2 of the drawings. This crank pin bearing 34 is adapted to move back and forth longitudinally of the second track bearing means 56 when the crank arm members 32 and 40 are rotated continuously in arcuate paths around the axis of the motor output shaft 28.

A second lever arm 60 is similar to the lever arm 46 and is provided with first track bearing means 62 which is similar to the track bearing means 50. The track bearing means 62 is provided with a pair of spaced apart rails 64 between which a second wiper guide bearing means 66 is reciprocally operable as indicated by an arrow B in FIG. 2 of the drawings as will be hereinafter described in detail.

The second lever arm 60 is stationarily, pivotally mounted on a second stationary pivot bearing 68 which is fixed to the plate 14 as shown in FIG. 1 of the drawings.

The second lever arm 60 is provided with a first lever portion comprising track bearing means 70 having spaced apart rails 72 between which a traversing bearing 74 is mounted and which is adapted to move in a reciprocatory manner as indicated by an arrow C in FIG. 2 of the drawings.

A third lever arm 76 is stationarily, pivotally mounted on a third stationary pivot bearing 78 carried by the frame plate 14 as shown best in FIGS. 1 and 2 of the drawings. Extending in one direction from the pivot bearing 78, the third lever arm is provided with a bearing track means 80 having a pair of spaced apart rails 82 between which the second crank pin bearing 42 is reciprocally movable back and forth as indicated by an arrow D in FIG. 2 of the drawings. Thus, the second crank pin bearing 42 is permitted to rotate in a circular path while traversing back and forth between the rails 82 of the third lever arm 76. This lever arm 76 is provided with a second lever portion 84 to which the traversing bearing 74 is secured. The traversing bearing 74, when pivoted around the axis of the stationary pivot bearing 78, tends to move back and forth between the rails 72 of the track bearing means 70 of the second lever arm 60 as indicated by the arrow C in FIG. 2 of the drawings.

The first wiper guide bearing means 54 is disposed to move in a rectilinear path between a pair of spaced apart rails 86 of a first bearing guide 88. The second wiper guide bearing means 66 is adapted to move back and forth in a rectilinear path between two spaced apart guide rails 90 of a second bearing guide 92. The bearing guides 88 and 92 are disposed near opposite ends of the mirror 22 and the first and second wiper guide bearing means 54 and 66 are provided with extending posts 94 and 96 respectively, which carry a wiper blade frame 98. This wiper blade frame 98 is provided with opposite end portions 100 and 102 which are carried by the respective posts 94 and 96 of the first and second wiper guide bearing means 54 and 66.

Figure 4:
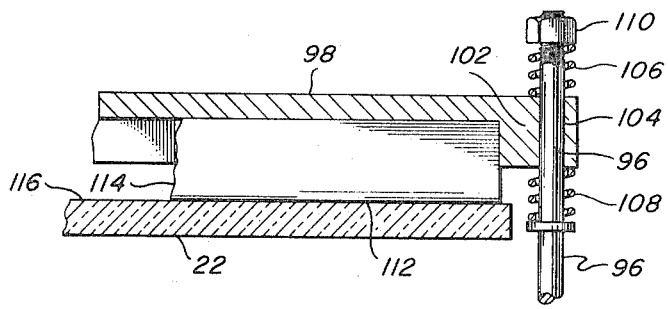
FIG. 4 is an enlarged fragmentary sectional view taken from the line 4—4 of FIG. 2.

As shown in FIG. 4 of the drawings, the end portion 102 of the wiper blade frame 98 is provided with an opening 104 which is slidably disposed on a post portion 96 of the second wiper guide bearing means.

Coil springs 106 and 108 are disposed on the post 96 and are adjustable by means of a screw threaded nut 110 screw-threaded on the post 96 so as to adjust bearing pressure of a wiping edge 112 of a wiper blade 114 carried in the wiper blade frame 98 relative to a surface 116 of the mirror 22.

The end 100 of the wiper blade frame 98 employs mechanism similar to that of the end 102 shown in FIG. 4 of the drawings.

Figure 3:
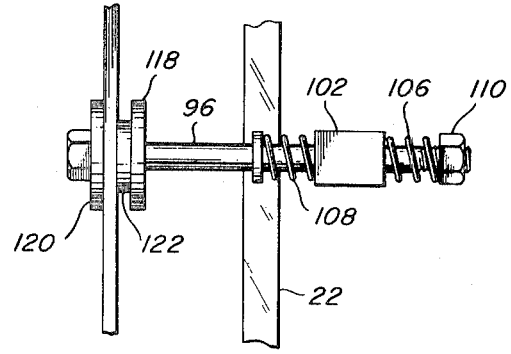
FIG. 3 is an enlarged fragmentary sectional view taken from the line 3—3 of FIG. 1.

As shown in FIG. 3 of the drawings, the second wiper guide bearing means is provided with a pair of bearing plates 118 and 120 which are disposed above and below the rails 90 of the second bearing guide 92. The second lever arm 60 is provided with a loop end portion 122 which interconnects the rails 64, and this loop portion 122 extends around the post 96 and traverses an arcuate path generally indicated by a broken line 124 in FIG. 2 of the drawings.

The first wiper guide bearing means 54 is similar to the second wiper guide bearing means 66 and its mechanism in connection with the rails 86 of the first bearing guide 88 is similar to that shown and described in FIG. 3 of the drawings.

Figure 5:
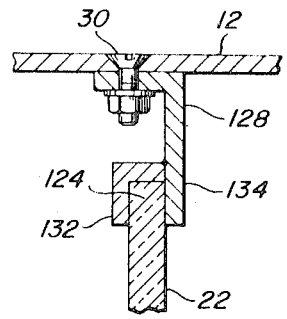
FIG. 5 is an enlarged fragmentary sectional view taken from the line 5—5 of FIG. 2.
Figure 6:
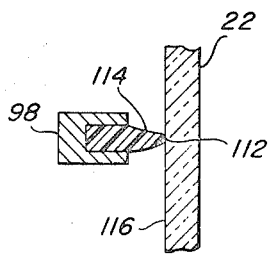
FIG. 6 is an enlarged fragmentary sectional view taken from the line 6—6 of FIG. 1.

As shown in FIGS. 2 and 5 of the drawings, the mirror 22, at its side edges 125 and 126, is carried by a plurality of brackets designated 128 which are secured to the box-shaped structure 12 of the frame 10 by means of bolts 130. The brackets 128 are bifurcated so that portions 132 and 134 form a channel for containing the edges of the mirror 22, all as shown best in FIG. 5 of the drawings.

It will be apparent that the brackets 128 may be removed from the box-shaped portion 12 of the frame 10 in order to expose the mechanism of the invention as shown in FIG. 2 of the drawings. The wiper blade frame 98 is readily removable by removing the nuts 110 from the correspondingly screw-threaded shanks 94 and 96 of the wiper guide bearing means 54 and 66.

In operation, the electric motor 24 with its reduction gear mechanism 26, slowly rotates the power output shaft 28 thereof in one direction carrying the crank arm mechanism which includes the crank arm members 32 and 40, together with the crank pin bearings 34 and 42 which, as hereinbefore described, traverse the bearing track means of the first and third lever arms 46 and 76 respectively to cause them to pivot back and forth about the respective stationary pivot bearings 48 and 78.

During pivotal movement of the third lever arm 76, the second lever arm 60 is correspondingly pivoted about the axis of the stationary pivot bearing 68 so that outer ends of the first and second lever arms 46 and 60 carry the respective first and second wiper guide bearing means 54 and 66 in the same direction longitudinally along the respective bearing guides 88 and 92. With each 180° of rotation of the shaft 28, the direction of the wiper guide bearings 54 and 66 are reversed relative to the mirror 22 so that the wiper 114 is constantly oscillated back and forth over the surface of the mirror 22 for effectively and efficiently wiping the same.

The motor 24 is an electric motor capable of dissipating heat into the housing 12 to thereby heat the mirror and to cause defrosting thereof.

I claim:
1. In a wiper mechanism, the combination of:
a frame;
a motor carried by said frame, said motor having a rotary power delivery shaft adapted to rotate continuously in one direction, said shaft having an axis of rotation;
a crank arm mechanism secured to said shaft and having first and second crank pin bearings spaced from said shaft and having respective first and second bearing axes disposed substantially parallel to said axis of rotation;
first and second lever arms having respective first and second intermediate portions;
first and second stationary pivot bearings pivotally mounting respective intermediate portions of said first and second lever arms on said frame, said first and second lever arms each having first elongated bearing track means extending respectively away from said first and second pivot bearings, said first lever arm having a second elongated bearing track means extending from said first stationary pivot bearing in a direction generally opposite to that of said first bearing track means thereof, said second lever arm having a first lever portion extending away from said second stationary pivot bearing in a direction opposite to that of said first bearing track means of said second lever arm;
a third lever arm having an intermediate portion;

a third stationary pivot bearing pivotally mounting said intermediate portion of said third lever arm on said frame, said third lever arm having an elongated bearing track means extending from said third stationary pivot bearing, said third lever arm having a second lever portion extending away from said third stationary pivot bearing and in a direction generally opposite to that of said elongated bearing track portion of said third lever arm;

a traversing bearing interconnecting said first and second lever portions; one of said lever portions having an elongated bearing track means adapted to be traversed by said traversing bearing;

said traversing bearing carried by the other one of said lever portions;

said first crank pin bearing disposed to traverse said second elongated bearing track means of said first lever arm;

said second crank pin bearing disposed to traverse said bearing track means of said third lever arm;

first and second stationary spaced-apart and substantially parallel elongated bearing guides carried by said frame;

first and second wiper guide bearing means adapted respectively to traverse said first and second bearing guides longitudinally thereof, said first bearing track means of said first lever arm disposed and adapted to be traversed longitudinally by said first wiper guide bearing means;

said first bearing track means of said second lever arm disposed and adapted to be traversed longitudinally by said second wiper guide bearing means;

a mirror carried by said frame;

and a wiper blade having first and second opposite ends carried respectively by said first and second wiper guide bearing means, said wiper blade having a wiper portion disposed to wipe said mirror in an oscillatory motion while said shaft of said motor rotates continuously in one direction.

2. The invention as defined in claim 1 wherein resilient means is carried by one of said wiper guide bearing means, said resilient means disposed and tending to apply slight force on said wiper blade to maintain said wiper portion thereof in contact with said mirror.

3. The invention as defined in claim 1 wherein resilient means is carried by one of said wiper guide bearing means, said resilient means disposed and tending to apply slight force on said wiper blades to maintain said wiper portion thereof in contact with said mirror, said mirror being substantially rectangular.

4. The invention as defined in claim 1 wherein:

resilient means is carried by one of said wiper guide bearing means, said resilient means disposed and tending to apply slight force on said wiper blades to maintain said wiper portion thereof in contact with said mirror, said mirror being substantially rectangular;

a box shaped housing containing said frame, motor bearings, crank arm mechanism, lever arms, pivots and said guides;

said housing substantially surrounding said mirror and being open at one side to allow said mirror to be seen at said one side.

5. The invention as defined in claim 1 wherein said frame comprises a housing which substantially encloses said motor in adjacent relation to said mirror, said motor being an electric motor capable of dissipating heat which tends to defrost said mirror.

References Cited

UNITED STATES PATENTS

| | | | |
|---|---|---|---|
| 2,677,844 | 5/1954 | McGlasson, Sr. | 15—250.29 |
| 3,526,920 | 9/1970 | Boyanich, Sr. | 15—250.29 |

PETER FELDMAN, Primary Examiner

U.S. Cl. X.R.

350—61